Sept. 14, 1943.  F. E. SMITH  2,329,490
HOSE COUPLING
Filed Aug. 12, 1942
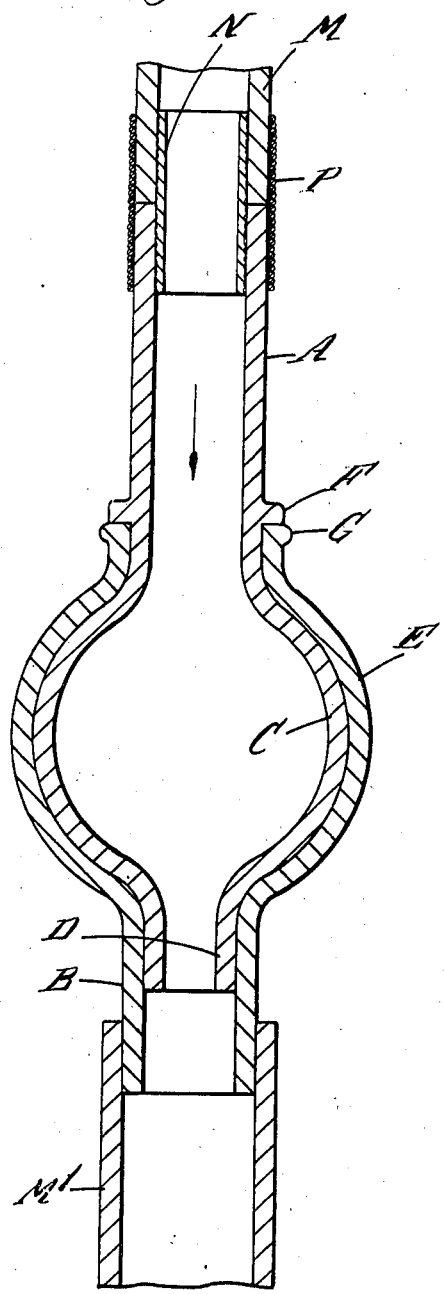
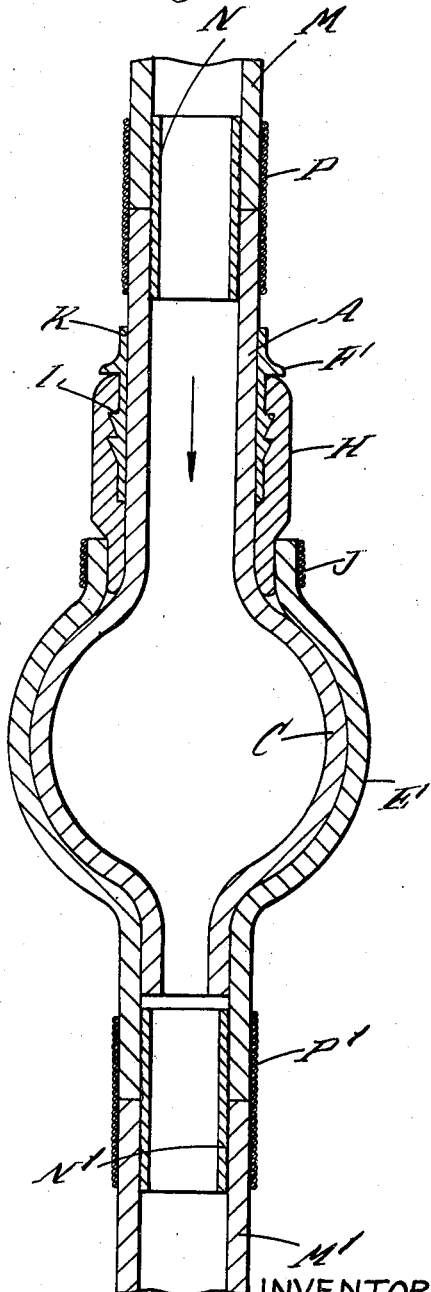
INVENTOR:
FRANKLIN ELIJAH SMITH
BY Haseltine, Lake & Co.
ATTORNEYS.

Patented Sept. 14, 1943

2,329,490

UNITED STATES PATENT OFFICE 2,329,490

HOSE COUPLING

Franklin Elijah Smith, Chelsfield, England

Application August 12, 1942, Serial No. 454,526
In Great Britain April 16, 1941

5 Claims. (Cl. 285—71)

This invention relates to hose couplings, and is especially applicable to fire hose, in which it is desirable that sections of hose pipe should be capable of being quickly and easily joined together in a secure and watertight manner.

According to the invention the coupling parts of two pipes which are to be joined are both made of bulbous form, that is, spherical, oval, or of similar shape, the bulbous member of one pipe, which may be called the spigot, being adapted to pass under compression into the bulbous member of the other pipe, which may be called the socket, and there to recover its original shape. The spigot may consist of resilient material such as rubber, and is adapted to be pressed into the socket, in entering which it is compressed, and then expands to fill the hollow interior of the socket, which latter may be made of non-resilient or semi-resilient material. The use of rubber is not essential, as both engaging members of the coupling may consist of hose fabric, and in that case the spigot member may be rubber-lined to prevent percolation. The spigot may have a tubular extension to pass beyond the bulbous cavity of the socket, and the neck or portion of the spigot behind its bulbous portion may have a ring or collar formed on or secured to it, to act as a stop to ensure correct location of the bulbous portion inside the bulb of the socket. The nose of the socket may also have a collar, ring, or washer of hard material against which the collar of the spigot abuts, and which resists expansion under internal pressure. The spigot may be provided with one or more ribs and the socket with a counterpart groove or grooves, either circumferential or oblique, which assist in holding the two parts firmly together, the ribs consisting of a resilient material which gives way when the spigot is pushed into the socket, and springs into interlocking position when the full penetration is accomplished. The chief function of the rib is to facilitate firm engagement while the hose is deflated, and to prevent the coupling members from slipping apart when internal pressure is removed, with consequent collapse of the bulb coupling, which is mainly relied on for resisting detachment when in operation.

In order that the said invention may be clearly understood and readily carried into effect, the same will now be further described with reference to the accompanying drawing.

Figure 1 illustrates in central longitudinal section a pipe coupling exemplifying the invention.

Figure 2 represents a similar coupling provided with additional securing means.

A and B indicate two pipes to be joined, the water or other fluid under pressure being assumed to travel in the direction indicated by the arrows. The pipe A is formed or provided with a resilient bulb C and at its extremity with an extension D projecting into the pipe B. The pipe coupling member B has an enlargement E of non-resilient or semi-resilient material in which the bulb C fits when inflated. A bead or collar F on the pipe A abuts against a bead or collar G (Figure 1) of hard material on the open end of the enlargement E.

Each section of the pipe is made with or attached to a resilient bulb C at one end and a bulb such as E at the other end.

As shown in Figure 2, a sleeve or collar K of resilient material is cemented or otherwise fastened on the spigot A, and is provided with two or other number of parallel ribs L the backs of which are perpendicular to the axis of the spigot, while the fronts of the said ribs are inclined. A collar H of metal or other hard material is formed with corresponding recesses to receive the said ribs, the narrower part of the said collar being secured by wires J at the front of the bulb member E, or tightened on by clamps or in any other convenient manner. The form of the ribs as shown facilitates their giving way during the insertion of the spigot and rising to resist displacement with their flat rear sides after insertion. The heads of the coupling members which carry the respective bulbs can be secured to the main lengths M and M' of the hose pipes by any convenient means, for example by metal sleeves N, N', roughened on their outer surfaces, against which the hose fabric is gripped by wires P, P' wrapped tightly around the hose fabric. Alternatively, the main lengths of pipe may be arranged to overlap the outer end of the cylindrical tubular part B of the coupling head as shown at M' in Figure 1, and cemented, wired, clamped, or otherwise suitably secured to the part B.

The assembling of the joint can be very easily and rapidly effected, and when in use to carry a stream of water or other fluid under pressure, the kinetic energy of the stream is utilised to press the bulb of the spigot against the interior of the bulb of the socket, the stream exerting pressure in all directions against the inside of the bulb of the spigot, so that as the speed or pressure of the flow increases, the resistance of the joint to leakage also increases as the inner bulb is tightened against the outer bulb.

What I claim and desire to secure by Letters Patent of the United States is:

1. A separable hose coupling for sections of hose pipe, wherein both the parts to be joined are of bulbous form, constituting a spigot having a pipe portion integral therewith and a socket also having a pipe portion integral therewith, the bulbous end of the spigot being of resiliently compressible material adapted to be passed under compression into the bulbous end of the socket and there to recover its original shape so as to form a temporary coupling.

2. Means for separably joining together sections of hose pipe, wherein each section has at one end a bulbous spigot of resilient material with an integral pipe portion thereon and at the other end a bulbous socket of harder material also with an integral pipe portion on the same, said bulbous spigot being resiliently compressible adapted to be passed under compression into the socket of an adjacent section and there to recover its original shape.

3. In a separable coupling for adjacent sections of hose pipe, the combination of a pipe section terminating integrally in a bulbous enlargement with a second pipe section terminating integrally in a compressible resilient bulb adapted to be forced under pressure into said enlargement, said resilient bulb having an extension in the direction of the longitudinal axis of the pipe sections adapted to enter a distance into the bore of the first-named pipe section behind the bulb thereof.

4. A coupling as in claim 1, wherein the spigot member of the coupling is provided with parallel ribs of resilient material and the socket member is provided with counterpart parallel grooves in which the said ribs engage and interlock when full penetration of the spigot member into the socket has been accomplished, said grooves and ribs being disposed in a substantially transverse direction with respect to the longitudinal axis of the spigot and socket members.

5. A hose coupling comprising a tubular coupling head of the resilient material including a collapsible bulb terminating in an extension of reduced diameter, a collar fastened on said tubular head behind the bulb, said collar having on its outer surface a plurality of ribs in parallel arrangement, a co-acting coupling head adapted to enclose said bulb, a second collar of hard material having a tubular shank and having on its inner surface a plurality of grooves to receive and interlock with said ribs, and a wire binding outside said last named coupling head to grip the material of the coupling head against the said tubular shank.

FRANKLIN ELIJAH SMITH.